United States Patent
Sata et al.

(10) Patent No.: US 8,618,950 B2
(45) Date of Patent: Dec. 31, 2013

(54) ELECTRONIC APPARATUS, AND CONTROL METHOD THEREOF

(75) Inventors: Yoshinori Sata, Shinagawa (JP);
Naoyuki Nagao, Shinagawa (JP);
Mitsuru Kobayashi, Shinagawa (JP);
Shinichi Katayama, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 187 days.

(21) Appl. No.: 12/929,432

(22) Filed: Jan. 24, 2011

(65) Prior Publication Data

US 2011/0181435 A1     Jul. 28, 2011

(30) Foreign Application Priority Data

Jan. 26, 2010     (JP) ................. 2010-014790

(51) Int. Cl.
| G08B 5/00 | (2006.01) |
| G08B 5/22 | (2006.01) |
| G09G 5/00 | (2006.01) |
| G09G 5/10 | (2006.01) |
| H04N 7/14 | (2006.01) |
| G06F 1/00 | (2006.01) |

(52) U.S. Cl.
USPC ....... 340/815.4; 340/7.32; 340/5.32; 345/3.1; 345/211; 345/204; 345/690; 348/14.07; 348/14.11; 713/340

(58) Field of Classification Search
USPC ............. 340/12.32, 310.06, 310.01, 310.02, 340/310.05, 310.07, 310.08, 538.11, 340/310.11, 657, 870.01; 709/223, 208, 709/219, 217, 211; 375/259; 345/1.1–3.1
See application file for complete search history.

(56) References Cited

U.S. PATENT DOCUMENTS

| 6,839,071 B1* | 1/2005 | Miyamoto .................... 715/788 |
| 6,919,792 B1* | 7/2005 | Battini et al. ................. 340/5.32 |
| 2002/0000984 A1* | 1/2002 | Asai et al. ...................... 345/211 |
| 2002/0042915 A1* | 4/2002 | Kubischta et al. .............. 725/38 |
| 2003/0007503 A1* | 1/2003 | Daum et al. ................... 370/465 |
| 2004/0172461 A1* | 9/2004 | Yoshino et al. ............... 709/220 |
| 2004/0227692 A1* | 11/2004 | Yoon .............................. 345/3.1 |
| 2005/0080496 A1* | 4/2005 | Hayes et al. .................... 700/65 |
| 2006/0145535 A1* | 7/2006 | Kaneko ............................. 307/1 |
| 2007/0229651 A1* | 10/2007 | Nakajima ................. 348/14.07 |
| 2009/0049205 A1* | 2/2009 | Park ................................. 710/4 |

FOREIGN PATENT DOCUMENTS

| JP | 5-292416 | 11/1993 |
| JP | 6-22380 | 1/1994 |
| JP | 2002-27666 | 1/2002 |
| JP | 2004-360946 | 12/2004 |
| JP | 2006-180384 | 7/2006 |

OTHER PUBLICATIONS

Japanese Office Action issued Jun. 11, 2013 in corresponding Japanese Application No. 2010-014790.

* cited by examiner

*Primary Examiner* — Jennifer Mehmood
*Assistant Examiner* — Mirza Alam
(74) *Attorney, Agent, or Firm* — Staas & Halsey LLP

(57) ABSTRACT

An electronic apparatus including: a first device that includes a first display portion, the first display portion displaying information concerning the operation of the first device; and a second device that includes a second display portion, the second display portion displaying the information which the first display portion has displayed, depending on at least one of the second device having been attached to the first device, the first device having supplied an electric power to the second device, and the first device and the second device having communicated mutually.

6 Claims, 6 Drawing Sheets

ELECTRONIC APPARATUS, AND CONTROL METHOD THEREOF

CROSS-REFERENCE TO RELATED APPLICATION

This application is based upon and claims the benefit of priority of the prior Japanese Patent Application No. 2010-014790, filed on Jan. 26, 2010, the entire contents of which are incorporated herein by reference.

FIELD

A certain aspect of the embodiments discussed herein is related to an electronic apparatus and a control method thereof.

BACKGROUND

There has been known an electronic apparatus including a plurality of devices. The plurality of devices are connected and communicated with each other, and one device supplies electric power to another device. A document 1 (Japanese Laid-Open Patent Application No. 2006-180384) discloses a communication unit that is connected to an external device, communicates with the external device and supplies electric power to the external device via an electric power line. A document 2 (Japanese Laid-Open Patent Application No. 2002-27666) discloses a technique in which a main body of an electronic apparatus supplies electric power to a remote controller that remotely operates the main body.

However, when cables are used for the communication between the plurality of devices or supply of the electric power, the cables may obstruct storage of the devices and person's traffic. Further, when one device is attached to another device and both of the devices operate, a display unit included in the another device may be hid by the one device. In this case, convenience for a user decreases.

SUMMARY

According to an aspect of the present invention, there is provided an electronic apparatus including: a first device that includes a first display portion, the first display portion displaying information concerning the operation of the first device; and a second device that includes a second display portion, the second display portion displaying the information which the first display portion has displayed, depending on at lest one of the second device having been attached to the first device, the first device having supplied an electric power to the second device, and the first device and the second device having communicated mutually.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A description will now be given, with reference to the accompanying drawings, of an embodiment of the present invention.

Figure 1A:
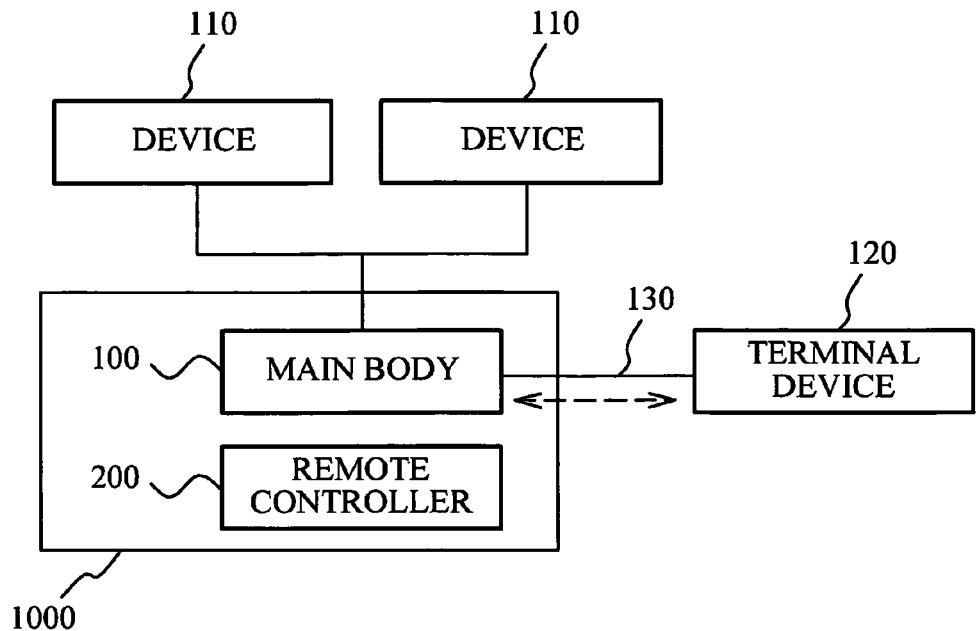
FIGS. 1A and 1B are block diagrams illustrating a system in which an electronic apparatus according to an embodiment is used.
Figure 1B:
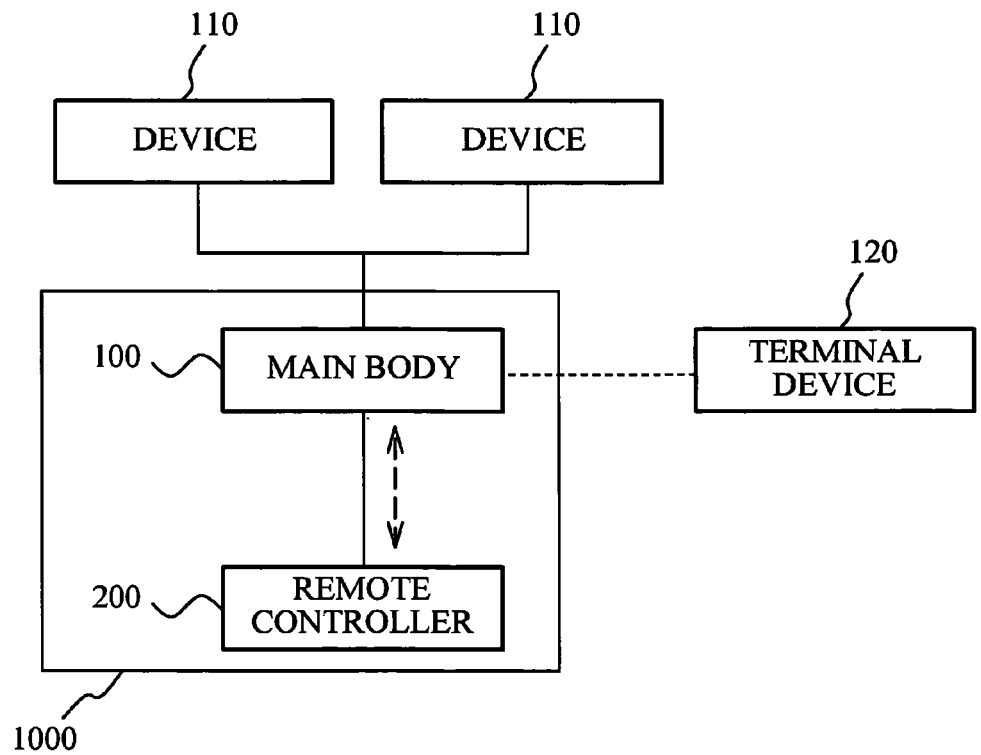

First, a description will now be given of a system in which an electronic apparatus according to an embodiment is used. In the embodiment, the electronic apparatus is a power supply controlling apparatus 1000. FIGS. 1A and 1B are block diagrams illustrating a power supply controlling system that uses the electronic apparatus.

As illustrated in FIGS. 1A and 1B, the power supply controlling system includes a power supply controlling apparatus 1000, devices 110, and a terminal device 120 (another device). A main body 100 of the power supply controlling apparatus 1000 is connected to the terminal device 120 via a network 130, and can communicate with the terminal device 120.

The main body 100 is a main body of the power supply controlling apparatus 1000, and drives by an alternating-current (AC) power supply, for example. The devices 110 are PCs (Personal Computers), printers, and so on, for example. The terminal device 120 is a PC (Personal Computer), for example. The network 130 is an internet, for example. The number of devices 110 indicates an example, and may be one, or three or more.

The main body 100 is connected to the devices 110, and supplies alternating-current (AC) electric power to the devices 110 for example. The terminal device 120 controls the main body 10 via the network 130. That is, the terminal device 120 switches the supply or stop of the electric power by the main body 100, schedules the supply of the electric power, and manages the history of supplied electric power and supplied electric energy. That is to say, the main body 100 is remotely operated by the terminal device 120.

As illustrated in FIG. 1B, there is a case where a remote controller 200 is connected to the main body 100, and controls the main body 100. That is, the remote controller 200 is a controlling device of the main body 100. By the remote controller 200, the communication between the main body 100 and the terminal device 120 is intercepted, so that the control of the main body 100 is unified to the control by the remote controller 200. Whether the control of the main body 100 is unified to the control by the remote controller 200 is switched according to setting of the main body 100 or the remote controller 200. For example, when the maintenance of the main body 100 is performed, it is convenient to control the main body 100 by the remote controller 200 at a place where the main body 100 has been set up, compared to the maintenance by remote operation.

Figure 2A:
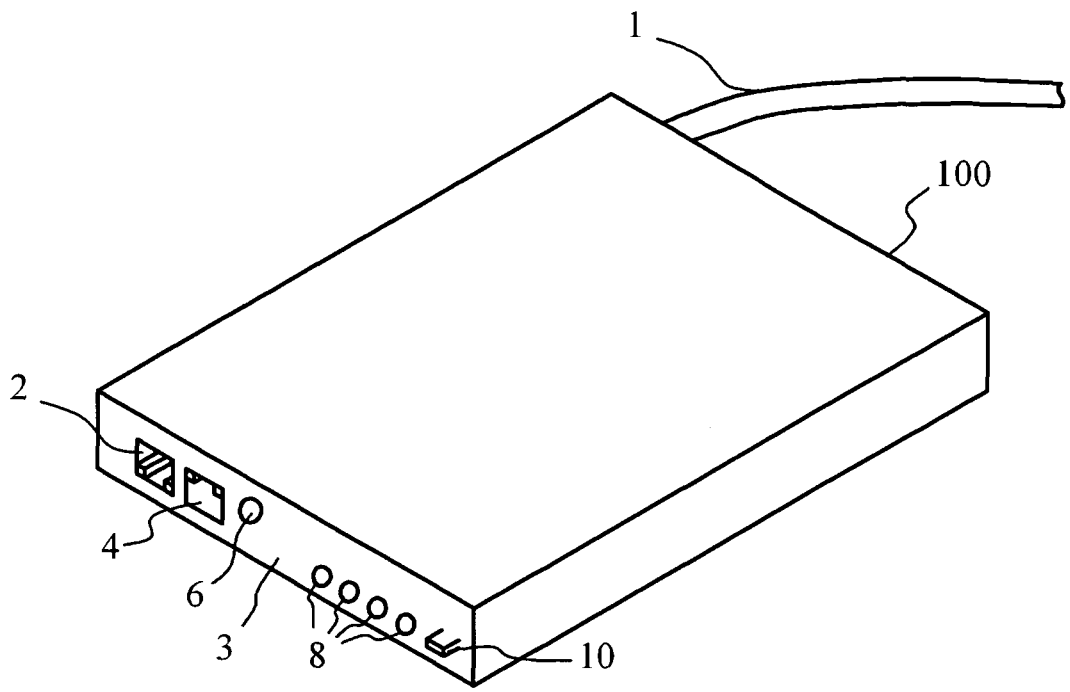
FIGS. 2A and 2b are perspective diagrams illustrating a power supply controlling apparatus according to the embodiment.
Figure 2B:
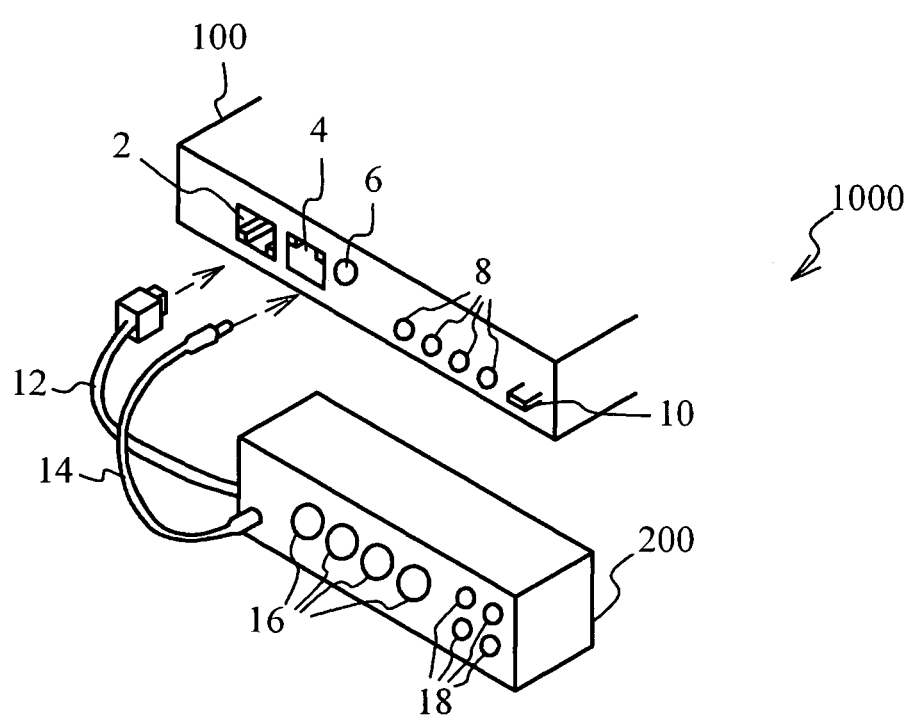

Next, a description will now be given of the configuration of the power supply controlling apparatus. FIGS. 2A and 2b are perspective diagrams illustrating the configuration of the power supply controlling apparatus.

As illustrated in FIG. 2A, the main body 100 of the power supply controlling apparatus 1000 includes interfaces (I/Fs) 2 and 4, a feeding port 6, LEDs (Light Emitted Diodes) 8 (a first display portion), and a switch 10. The main body 100 drives by the AC power supply supplied from a cable 1.

The I/F 4 is a plug of a LAN (Local Area Network) cable, for example, and is used for the communication of the terminal device 120 illustrated in FIGS. 1A and 1B. The feeding port 6 is used for the supply of the electric power to the remote controller 200. The LEDs 8 display information concerning the operation of the main body 100. That is, when the main body 100 includes a plurality of feeding ports 21 (described later in FIG. 3), and each of the feeding ports 21 is connected to the devices 110 for example, information indicating which of feeding ports 21 supplies the electric power can be displayed by lighting the LEDs 8. The switch 10 is a switch having a projection shape, for example. The I/Fs 2 and 4, the feeding port 6, the LEDs 8, and the switch 10 are provided on a surface 3. Next, a description will now be given of a case where the main body 100 is connected to the remote controller 200.

As illustrated in FIG. 2B, cables 12 and 14 are connected to the remote controller 200. Moreover, an operation unit 16 and LEDs 18 (a second display portion) are provided on the remote controller 200.

The main body 100 is connected to the remote controller 200 via the cable 12 inserted into the I/S 2 of the main body 100. The main body 100 and the remote controller 200 communicate with each other to control the main body 100. The main body 100 supplies direct-current (DC) power to the remote controller 200 via the cable 14 inserted into the feeding port 6, for example. The operation unit 16 is buttons, dials, and so on, for example. A user controls the main body 100 by operating the operation unit 16. The LEDs 18 are described later.

For example, at least one magnet is provided on a surface of the remote controller 200 opposite to the surface on which the operation unit 16 and the LEDs 18 of the remote controller 200 are provided. The remote controller 200 is attached to the surface 3 of the main body 100 by the magnet. When the remote controller 200 is attached to the main body 100, the main body 100 and the remote controller 200 integrally operate as if they are a single apparatus. When the remote controller 200 is attached to the surface 3, the LEDs 8 are covered by the remote controller 200, and hence it is difficult for the user to check the LEDs 8 by sight. It should be noted that a concave portion and a convex portion that can engage mutually may be provided on the main body 100 and the remote controller 200 on behalf of the magnet, for example. Further, the remote controller 200 may be attached to the main body 100 with screws.

The LEDs 18 provided on the remote controller 200 displays the information which the LEDs 8 have displayed. That is, the LEDs 18 perform alternative operation of the LEDs 8. Specifically, when the remote controller 200 is attached to the main body 100, the switch 10 is depressed by the remote controller 200 for example. The LEDs 18 begin the alternative operation of the LEDs 8 according to the depression of the switch 10. Another example of the beginning of the alternative operation is described later.

Figure 3:
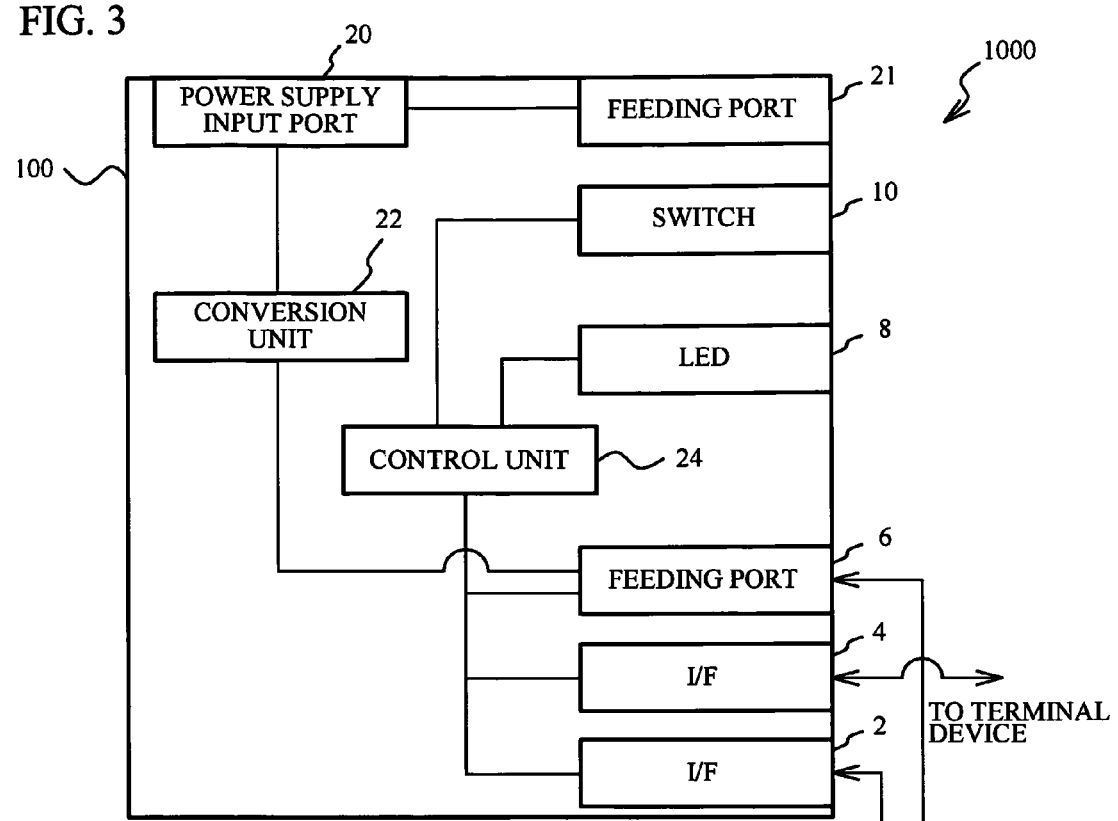
FIG. 3 is a block diagram illustrating the configurations of a main body and a remote controller of the power supply controlling apparatus.
Figure 3:
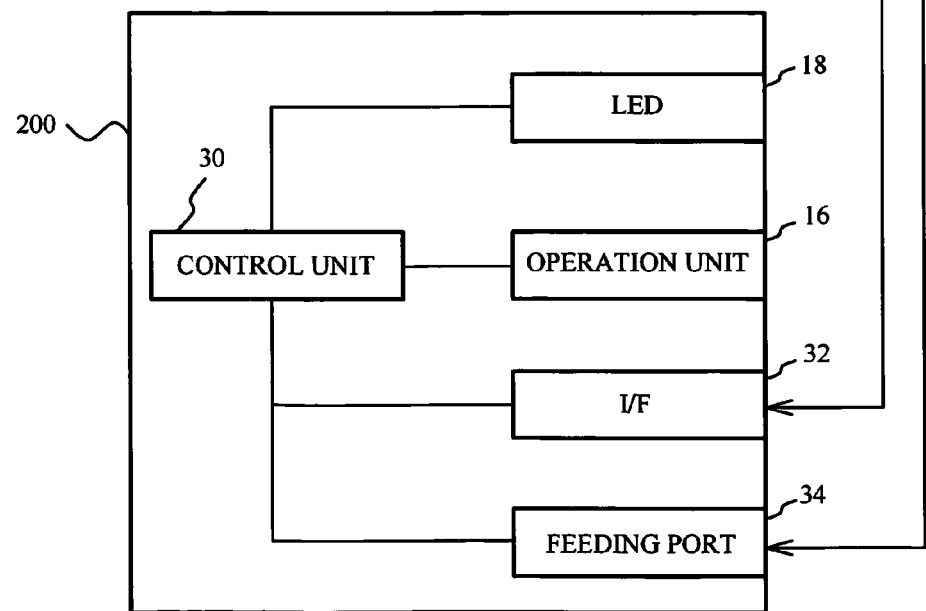

Next, a description will now be given of the respective configurations of the main body 100 and the remote controller 200. FIG. 3 is a block diagram illustrating the configurations of the main body and the remote controller.

As illustrated in FIG. 3, the main body 100 includes a power supply input port 20, a conversion unit 22, a control unit 24, the I/Fs 2 and 4, feeding ports 6 and 21, the LEDs 8, and the switch 10. The conversion unit 22 is an alternating-current (AC) adapter, for example. The control unit 24 is a CPU (Central Processing Unit), for example. In FIGS. 2A and 2B, the I/Fs 2 and 4, the feeding port 6, the LEDs 8, and the switch 10 are explained, and hence a description thereof is omitted.

The cable 1 illustrated in FIG. 2A is connected to the power supply input port 20, and alternating-current (AC) electric power is input to the power supply input port 20. The conversion unit 22 converts the alternating-current (AC) electric power into direct-current (DC) electric power. The main body 100 supplies the electric power converted by the conversion unit 22 to the remote controller 200 via the feeding port 6. Also, the main body 100 supplies the electric power to the devices illustrated in FIGS. 1A and 1B via the feeding port 21.

The control unit 24 controls communication with the remote controller 200 via the I/F 2, communication with the terminal device 120 via the I/F 4, the supply of the electric power via the feeding port 6, the supply of the electric power via the feeding port 21, and lighting of the LEDs 8. The control unit 24 receives a signal output from the switch 10 according to the depression of the switch 10. The control unit 24 intercepts the communication with the terminal device 120 via the I/F 4, and communicates with the remote controller 200 via the I/F 2. In this case, the control unit 24 turns off the LEDs 8.

The remote controller 200 includes the operation unit 16, the LEDs 18, a control unit 30, an interface (I/F) 32, and a feeding port 34. In FIG. 2B, the operation unit 16 and the LEDs 18 are explained, and hence a description thereof is omitted.

The controller unit 30 controls the LEDs, the I/F 32, and the feeding port 34. The control unit 30 controls the communication with the main body 100 so that the remote controller 200 controls the main body 100 via the I/F 32 corresponding to contents of the operation by the operation unit 16. In this case, the control unit 30 turns on the LEDs 18.

Figure 4A:
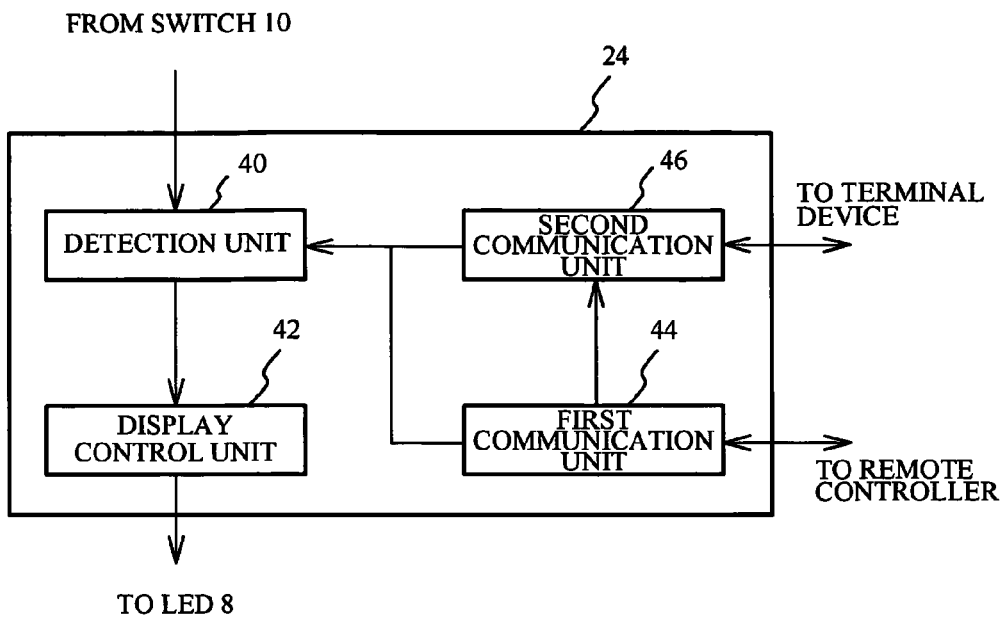
FIG. 4A is a functional block diagram illustrating the configuration of the main body of the power supply controlling apparatus.
Figure 4B:
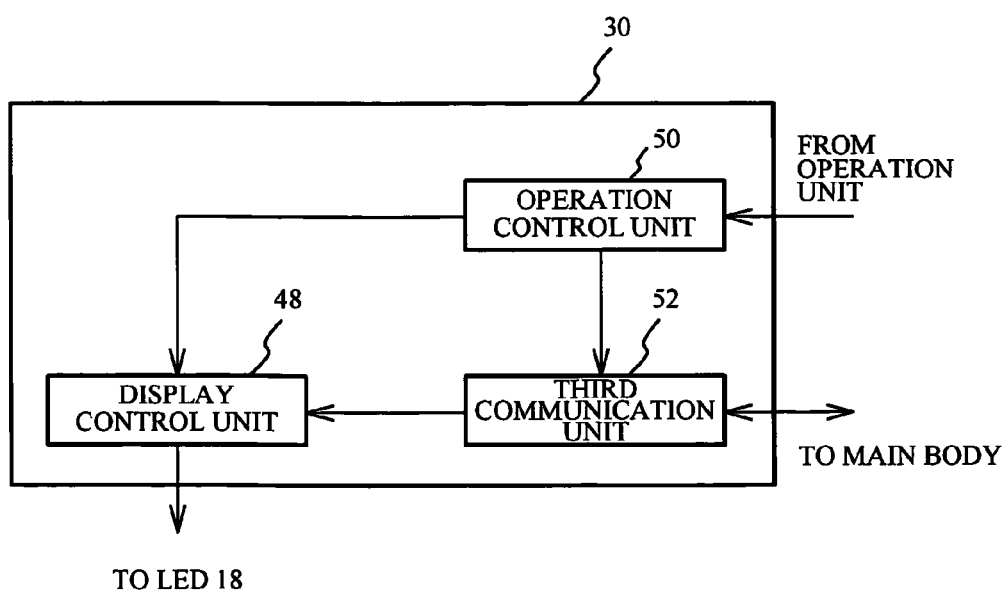
FIG. 4B is a functional block diagram illustrating the configuration of the remote controller of the power supply controlling apparatus.

Next, a description will now be given, with reference to a functional block diagram, of the configurations of the main body 100 and the remote controller 200. FIG. 4A is a functional block diagram illustrating the configuration of the control unit 24 included in the main body 100. FIG. 4B is a functional block diagram illustrating the configuration of the control unit 30 included in the remote controller 200.

As illustrated in FIG. 4A, the control unit 24 includes a detection unit 40, a display control unit 42, a first communication unit 44, and a second communication unit 46.

The detection unit 40 receives a signal output from the switch 10 according to the depression of the switch 10, and detects that the remote controller 200 has attached to the main body 100. The display control unit 42 turns on the LEDs 8 based on a operation state of the main body 100. The display control unit 42 turns off the LEDs 8 depending on the detection unit 40 having detected the attachment of the remote controller 200.

The first communication unit 44 communicates with the remote controller 200 via the I/F 2 of FIG. 3 to control the main body 100 by the remote controller 200. Further, the first communication unit 44 transmits information concerning the operation of the main body 100 to the remote controller 200.

The second communication unit 46 performs communication between the main body 100 and the terminal device 120 of FIG. 1A via the I/F 4 of FIG. 3 to control the main body 100. Further, the second communication unit 46 intercepts the communication between the main body 100 and the terminal device 120 depending on the first communication unit 44 having performed communication control between the main body 100 and the remote controller 200.

As illustrated in FIG. 4B, the control unit 30 includes a display control unit 48, an operation control unit 50, and a third communication unit 52.

The operation control unit 50 receives a signal output from the operation unit 16 depending on operation of the operation unit 16. The third communication unit 52 communicates with the main body 100 via the I/F 32 of FIG. 3 to control the main body 100 by the remote controller 200 depending on the operation control unit 50 having received the signal. The third communication unit 52 receives the information concerning the operation of the main body 100 from the first communication unit 44. The display control unit 48 turns on the LEDs 18 depending on the third communication unit 52 having received the information concerning the operation of the main body 100.

Figure 5:
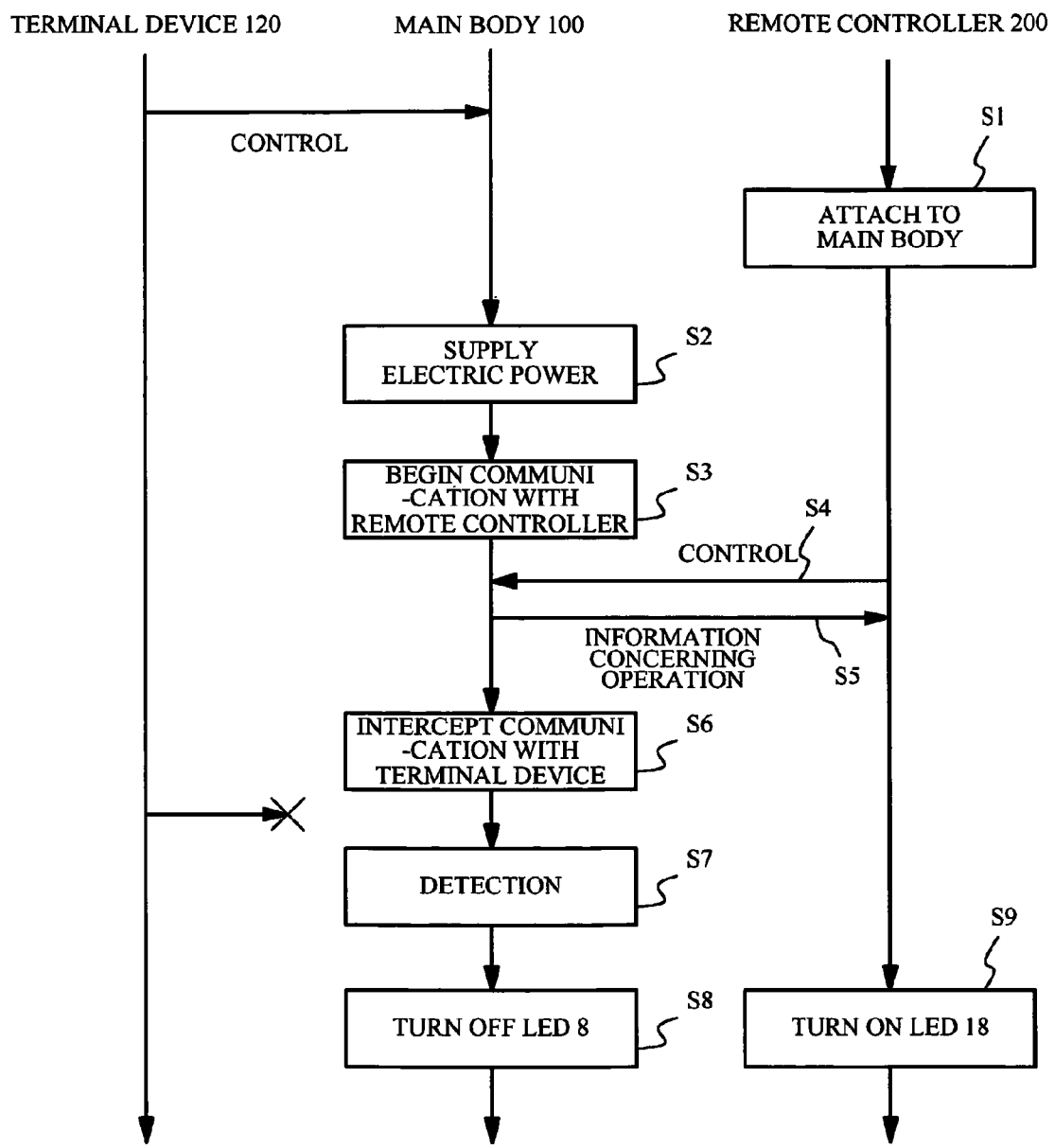
FIG. 5 is a sequence diagram illustrating the control of the power supply controlling apparatus.

Next, a description will now be given of the control of the electronic apparatus. FIG. 5 is a sequence diagram illustrating the control of the electronic apparatus according to the embodiment.

As illustrated in FIG. 5, the main body 100 is in a state controlled by the terminal device 120. First, the remote controller 200 is attached to the main body 100 (step S1). When the cable 14 illustrated in FIG. 2B is inserted into the feeding port 6, the main body 100 supplies the electric power to the remote controller 200 (step S2). Also, when the cable 12 illustrated in FIG. 2B is inserted into the I/F 2, the main body 100 begins communication with the remote controller 200 (step S3). Even when the remote controller 200 is not attached to the main body 100, the supply of the electric power (step S2) and the communication (step S3) can be performed by inserting the cables 14 and 12 illustrated in FIG. 2B into the feeding port 6 and the I/F 2, respectively. That is, the order of steps S1 to S3 can be changed.

After step S3, the remote controller 200 controls the main body 100 (step S4). The main body 100 transmits the information concerning the operation of the main body 100 to the remote controller 200 (step S5). Further, the main body 100 intercepts the communication with the terminal device 120 depending on execution of the control by the remote controller 200 (step S6).

The main body 100 detects that the remote controller 200 has attached to the main body 100 (step S7). After step S7, the main body 100 turns off the LEDs 8 (step S8). The remote controller 200 turns on the LEDs 18 (step S9). That is, the LEDs 18 perform the alternative operation of the LEDs 8 depending on attaching the remote controller 200 to the main body 100.

Figures 6A, 6B:
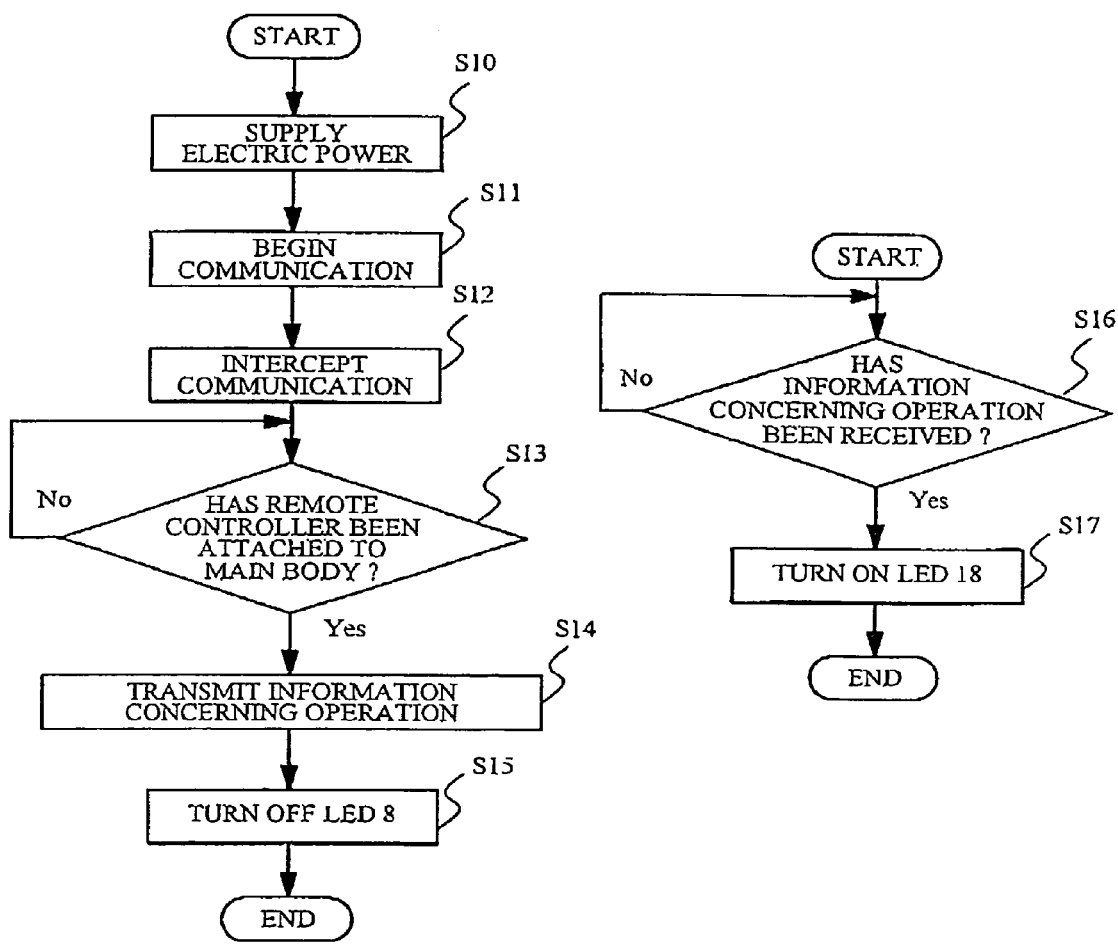
FIG. 6A is a flowchart illustrating the control of the main body of the power supply controlling apparatus.
FIG. 6B is a flowchart illustrating the control of the remote controller of the power supply controlling apparatus.

Next, a description will now be given of the respective controls of the main body 100 and the remote controller 200. FIG. 6A is a flowchart illustrating the control of the main body 100 of the power supply controlling apparatus according to the embodiment. FIG. 6B is a flowchart illustrating the control of the remote controller 200 of the power supply controlling apparatus according to the embodiment. First, a description will now be given of the control of the main body 100.

As illustrated in FIG. 6A, the main body 100 supplies the electric power to the remote controller 200 (step S10). The first communication unit 44 begins the communication with the remote controller 200 (step S11). After step S11, the second communication unit 46 intercepts the communication with the terminal device 120 depending on the setting of the main body 100 or the remote controller 200 (step S12).

The detection unit 40 judges whether the remote controller 200 has been attached to the main body 100 (step S13). When the answer to step S13 is "NO", i.e., the detection unit 40 does not detect the attachment of the remote controller 200, the control of step S13 is repeated. When the answer to step S13 is "YES", i.e., the detection unit 40 detects the attachment of the remote controller 200, the first communication unit 44 transmits the information concerning the operation of the main body 100 to the remote controller 200 (step S14).

After step S14, the display control unit 42 turns off the LEDs 8 (step S15). After step S15, the present control is terminated.

Next, a description will now be given of the control of the remote controller 200 with reference to FIG. 6B.

As illustrated in FIG. 6B, the third communication unit 52 judges whether the third communication unit 52 has received the information concerning the operation of the main body 100 from the first communication unit 44 of the main body 100 (step S16). When the answer to step S16 is "NO", the control of step S16 is repeated. When the answer to step S16 is "YES", the display control unit 48 turns on the LEDs 18 (step S17). After step S17, the present control is terminated.

According to the embodiment, in the power supply controlling apparatus 1000 in which the main body 100 and the remote controller 200 are connected with each other, and the main body 100 supplies the electric power to the remote controller 200, when the remote controller 200 is attached to the main body 100, the LEDs 18 of the remote controller 200 can be substituted for the LEDs 8 and perform the display operation. That is, when the remote controller 200 is attached to the main body 100, the LEDs 18 display the information concerning the operation of the main body 100, so that the user can easily confirm the operation state of the main body 100. Thereby, it is possible to realize the power supply controlling apparatus 1000 that operates in a state that the remote controller 200 has attached to the main body 100, and that has high convenience.

The main body 100 communicates with the remote controller 200. Therefore, the user can control the main body 100 with the remote controller 200 at the place where the main body 100 has been set up. For example, convenience rises especially when the maintenance of the main body 100 is performed. In this case, although the above-mentioned embodiment teaches that the communication between the main body 100 and the terminal device 120 is intercepted (step S6 of FIG. 5, and step S12 of FIG. 6A), the communication between the main body 100 and the terminal device 120 may not be intercepted.

When the LEDs 8 are provided on the surface 3 to which the remote controller 200 is attached, as illustrated in FIG. 2B, the LEDs 8 are cover by the remote controller 200. That is, it is difficult for the user to check the LEDs 8 by sight. However, the LEDs provided on the remote controller 200 performs the alternative operation, so that the user can confirm the operation state of the main body 100, and the convenience of the user improves more. Even when the LEDs 8 are not covered by the remote controller 200 for example, the LEDs 18 display the information concerning the operation of the main body 100, and hence the convenience of the user improves.

When the LEDs 18 are turned on, the LEDs 8 may not be turned off. However, when the user confirms the operation state of the main body 100 with the LEDs 18, and does not use the LEDs 8, it is undesirable to turn on the LEDs 8 from the viewpoint of the power saving. It is therefore desirable to turn off the LEDs 8 from the viewpoint of the power saving and the cost reduction.

The LEDs 18 provided on the remote controller 200 may display information indicating that the control is performed by the remote controller 200, for example, in addition to the information to be displayed on the LEDs 8 provided on the main body 100. Also, display devices provided on the remote controller 200 and the main body 100 are not limited to the LEDs. Even if the display devices are liquid crystal monitors for example, the present embodiment is applicable.

The LEDs 18 begins the alternative operation depending on mechanically detecting the insertion of the cable 12 or 14 into the I/F 2 or feeding port 6, communicating between the main body 100 and the remote controller 200, or the electric power being supplied from the feeding port 6 other than the depression of the switch 10. Further, the above-mentioned triggers of the beginning of the alternative operation may be combined. That is, the LEDs 18 displays the information which the LEDs 8 have displayed, depending on at lest one of the remote controller 200 having been attached to the main body 100, the main body 100 having supplied the electric power to the remote controller 200, and the main body 100 and the remote controller 200 having communicated mutually. Thereby, the alternative operation of the LEDs 18 is automatically performed.

The user operates switches or buttons provided on the main body 100 and the remote controller 200, and hence the LEDs 18 may be turned on by hand. The user may turn off the LEDs 8 by hand. A detection portion detecting at least one of the above-mentioned triggers and the manual operation may be combined and used.

Although the power supply controlling apparatus 1000 includes the main body 100 and the remote controller 200 for controlling the main body 100, the present embodiment is limited to this. For example, the electronic apparatus according to the embodiment may include a controlling device and a dependent device controlled by the controlling device. In this case, the controlling device may supply the electric power to the dependent device, and the dependent device may substitute the display function of the controlling device. The present embodiment is also applicable to an electronic apparatus other than the power supply controlling apparatus.

Although the main body 100 drives by the AC power supply in the above-mentioned description, the main body 100 may drive by the DC power supply. The electric power which the main body 100 supplies to the devices 110 and the remote controller 200 may be either the AC electric power or the DC electric power.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An electronic apparatus comprising:
    a first device that includes a first controller and a first display portion displaying information concerning the operation of the first device; and
    a second device that controls the operation of the first device, includes a second controller and a second display portion displaying information concerning the operation of the first device,
    wherein the first controller starts transmitting information concerning the operation of the first device to the second device when the first controller determines that the second device is attached to the first device, the supply of electric power from the first device to the second device is started, or communication between the first device and the second device is started, and
    the second controller turns on the second display portion substituting the first display portion to display the information when the information concerning the operation of the first device is received.

2. The electronic apparatus according to claim 1, wherein the first device communicates with another device different from the second device controlling the operation of the first device, and the first controller intercepts the communication with the another device when the first controller determines that the second device is attached to the first device, the supply of the electric power from the first device to the second device is started, or the communication between the first device and the second device is started.

3. The electronic apparatus according to claim 1, wherein the first device includes a switch detecting whether the second device is attached to the first device or not, and
    the first controller turns off the first display portion when the switch detects that the second device is attached to the first device.

4. The electronic apparatus according to claim 1, wherein the first controller turns off the first display portion that is displaying the information when the first controller determines that the second device is attached to the first device, the supply of the electric power from the first device to the second device is started, or the communication between the first device and the second device is started.

5. A control method of an electronic apparatus including a first device comprising a first display and a second device controlling an operation of the first display, detachable from the first device and comprising a second display, the method comprising:
    determining whether the second device is attached to the first device, the supply of electric power from the first device to the second device is started, or communication between the first device and the second device is started;
    transmitting information concerning an operation of the first device to the second device based on the determination; and
    displaying on the second display the information concerning the operation of the first device when the second device has received the information.

6. The control method of the electronic apparatus according to claim 5, further comprising:
    turning off the first display when it is determined that the second device is attached to the first device, the supply of the electric power from the first device to the second device is started, of the communication between the first device and the second device is started.

* * * * *